(No Model.)
J. T. GREENWOOD.
CULTIVATOR.
No. 308,605. Patented Dec. 2, 1884.
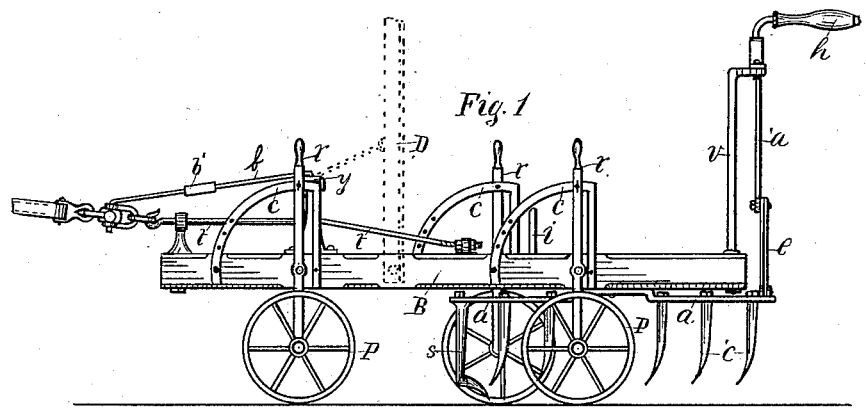
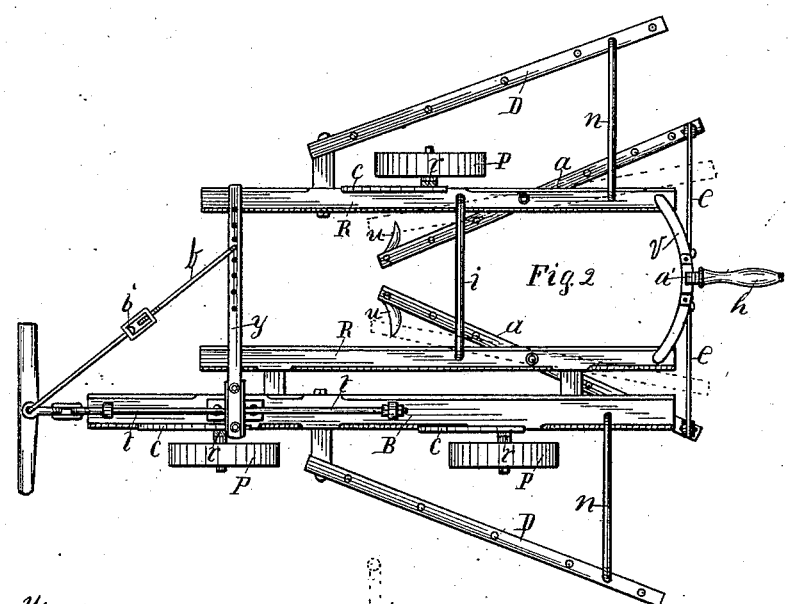
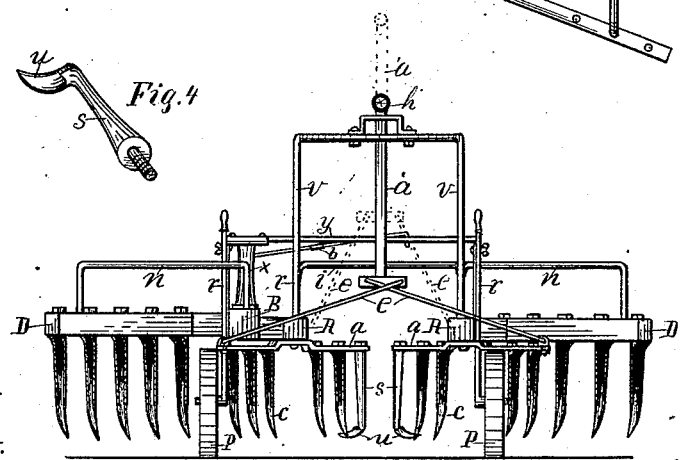
Attest.
John C. Perkins
John H. Chase
Inventor.
John T. Greenwood
By Lucius C. West
Atty.

UNITED STATES PATENT OFFICE.

JOHN T. GREENWOOD, OF KALAMAZOO, MICHIGAN.

CULTIVATOR.

SPECIFICATION forming part of Letters Patent No. 308,605, dated December 2, 1884.

Application filed April 21, 1884. (No model.)

*To all whom it may concern:*

Be it known that I, JOHN T. GREENWOOD, a citizen of the United States, residing at Kalamazoo, county of Kalamazoo, State of Michigan, have invented a new and useful Side-Draft Cultivator, of which the following is a specification.

The object of my invention is to construct a cultivator which when used with one horse will run straddle of a row of vegetation and cultivate each side of said row.

Other objects are set forth in the description and claims.

In the drawings forming a part of this specification, Figure 1 is a side elevation; Fig. 2, a top view; Fig. 3, a rear end elevation, and Fig. 4 a perspective view of one of the shares.

With the main draft-beam B is connected on one side the share-frame R R. The two beams of this side frame are connected by cross-bars $y$, $i$, and $v$, which are raised above the plane of the beams to clear the vegetation, Fig. 3. The bar $v$ is raised higher than the others, to form a supporting-brace to the operating-handle $a'$ $h$. The share-beams which are to work each side of the row are pivoted centrally to the side bars of the frame R. These share-beams $a$ $a$ are connected with the operating-handle by means of crossed bars $e$, pivotally coupled therewith, Fig. 3. By raising on the handle $h$ the rear ends of the share-beams $a$ $a$ are carried toward each other, and the forward ends are carried away from each other, as indicated by dotted position in Fig. 2. Thus the operator is enabled to work close up to the sides of the row or far away, at will. The horse, which is connected with the draft-beam B, walks between two rows, while the share-beams $a$ $a$ run one on each side of a row. Any suitable shares may be used.

On the forward ends of the beams $a$ $a$, I use two shares, S, provided with a blade, $u$, extending laterally from the row, which cuts all the weeds and throws the soil in a manner not to bury small vegetation.

The device is provided with wheels P P, which are pivotally connected with the lower end of levers $r$ $r$. These levers are centrally pivoted to the frame in proper locations, and are held at any desired angle to govern the height of the wheels by the circle-segment C in the usual manner of locking lifting-levers.

In Fig. 1 the wheels are lowered, as when running the device from one field to another. The draft-beam B is provided with a draw-bar, $t$, secured centrally to the top of said beam, and extended forward in an elevated angle to the whiffletree, passing loosely through a casting with which the bar $y$ is connected, and loosely through a loop on the forward end of said beam B. By this means the draft-power has a proper leverage on the device to keep it in the soil and to draw it straight ahead. In connection with the draw-rod $t$ is used an adjustable equalizer, $b$, which enables the draft-power to overcome the constant tendency of the device to draw sidewise, owing to the side draft of the frame R. The bar $b$ may be adjusted shorter or longer by means of the threaded swivel $b'$, and the location changed by hooking in different holes of the bar $y$.

Such a device will be found of especial utility in gardens among vegetation of small growth planted closely together, and among sugar-cane, cotton, and even corn it will be found of great service, as it can be used when the rows are just plain enough to be seen, and no hand-hoeing will be afterward needed.

More than one horse may be used, if desired.

D D are two share-beams which may be used in connection with the device for field cultivation.

In cultivating corn and such growth where the rows are far apart one of the beams D is used. They are pivotally connected at their forward end with the beam R, and are connected at the rear by means of detachable elevated bars $n$ $n$, Fig. 3. When not desired for use, these bars D may be detached or swung up and secured in position shown by dotted lines in Fig. 1.

Having thus described my invention, what I claim as new, and desire to secure by Letters Patent, is—

1. A one-horse side-draft cultivator consisting of a draft-beam, a share-frame secured to one side thereof, share-beams provided with shares centrally pivoted to the side beams of the share-frame, the handle and crossed rods for operating the share-beams, the draft-rod and adjustable equalizer, and supporting-wheels, all in combination, substantially as set forth.

2. The combination, with the side-draft share-frame, and the draft-beam, and the share-beams pivotally connected with the under side of the beams of the share-frame, of the detachable pivotally-connected side share-beams, substantially as set forth.

3. A side-draft cultivator consisting of a draft-beam, a share-frame provided with share-beams secured to one side of the draft-beam, supporting-wheels, means for governing the share-beams, and means for governing the line of draft, substantially as set forth.

4. A one-horse side-draft cultivator consisting of a draft-beam, a share-frame secured to one side thereof, and provided with share-beams, all adapted to operate substantially as set forth.

In testimony of the foregoing I have hereunto subscribed my name in the presence of two witnesses.

JOHN T. GREENWOOD.

Witnesses:
JOHN H. CHASE,
EUGENE HORTON.